(12) United States Patent
Mou et al.

(10) Patent No.: US 11,572,873 B2
(45) Date of Patent: Feb. 7, 2023

(54) THIN PROFILE GAS TRANSPORTING DEVICE

(71) Applicant: MICROJET TECHNOLOGY CO., LTD., Hsinchu (TW)

(72) Inventors: Hao-Jan Mou, Hsinchu (TW); Shih-Chang Chen, Hsinchu (TW); Jia-Yu Liao, Hsinchu (TW); Shih-Te Chan, Hsinchu (TW); Chung-Wei Kao, Hsinchu (TW); Chi-Feng Huang, Hsinchu (TW); Yung-Lung Han, Hsinchu (TW); Chun-Yi Kuo, Hsinchu (TW); Chin-Wen Hsieh, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 17/394,650

(22) Filed: Aug. 5, 2021

(65) Prior Publication Data

US 2022/0120269 A1    Apr. 21, 2022

(30) Foreign Application Priority Data

Oct. 20, 2020  (TW) ................................. 109136330

(51) Int. Cl.
  *F04B 45/047*  (2006.01)
  *F16K 15/14*  (2006.01)

(52) U.S. Cl.
  CPC ........ *F04B 45/047* (2013.01); *F16K 15/1401* (2021.08); *F16K 15/144* (2013.01)

(58) Field of Classification Search
  CPC ... F04B 45/047; F16K 15/1401; F16K 15/144

USPC ...................................................... 417/413.2
  See application file for complete search history.

(56) References Cited

U.S. PATENT DOCUMENTS

| | | | | |
|---|---|---|---|---|
| 8,746,326 | B2 * | 6/2014 | Mou | ..................... H01L 23/473 |
| | | | | 165/80.4 |
| 10,677,773 | B2 * | 6/2020 | Mou | ..................... G01N 33/007 |
| 10,955,399 | B2 * | 3/2021 | Mou | .................. G01N 33/0009 |
| 11,187,215 | B2 * | 11/2021 | Mou | ..................... G08B 21/12 |
| 11,187,225 | B2 * | 11/2021 | Mou | ......................... F24F 11/30 |
| 11,204,335 | B2 * | 12/2021 | Mou | .................. G01N 33/0047 |
| 2009/0060750 | A1 * | 3/2009 | Chen | ..................... F04B 43/043 |
| | | | | 417/26 |

(Continued)

FOREIGN PATENT DOCUMENTS

| | | |
|---|---|---|
| CN | 208686556 U | 4/2019 |
| TW | M465472 U | 11/2013 |
| WO | 2020084978 A1 | 4/2020 |

*Primary Examiner* — Craig M Schneider
*Assistant Examiner* — Frederick D Soski
(74) *Attorney, Agent, or Firm* — McClure, Qualey & Rodack, LLP (57) ABSTRACT

A thin profile gas transporting device includes a gas collecting plate, a valve sheet, a discharge sheet, and a gas pump. The gas pump is disposed on the gas collecting plate. The gas collecting plate, the valve sheet, and the discharge sheet are stacked and assembled sequentially. Through simplifying the structures of the gas collecting plate and the discharge sheet, the thicknesses of the gas collecting plate and the discharge sheet can be reduced. Moreover, through the arrangement of several pressure relief holes, the pressure relieving operation can be performed rapidly and quietly.

14 Claims, 12 Drawing Sheets

(56) References Cited

U.S. PATENT DOCUMENTS

| | | | |
|---|---|---|---|
| 2009/0159830 A1* | 6/2009 | Chen | F04B 43/0009 251/356 |
| 2009/0217994 A1* | 9/2009 | Chen | B41J 2/17596 137/605 |
| 2009/0232683 A1* | 9/2009 | Hirata | F04B 45/047 417/413.2 |
| 2009/0242060 A1* | 10/2009 | Chen | F04B 43/046 137/814 |
| 2009/0242061 A1* | 10/2009 | Chen | F04B 53/1062 137/833 |
| 2009/0270347 A1* | 10/2009 | Strong | A61P 11/02 514/55 |
| 2012/0085949 A1* | 4/2012 | Chen | F04B 43/043 251/129.01 |
| 2013/0213506 A1* | 8/2013 | Chen | F16K 31/02 251/129.06 |
| 2014/0166140 A1* | 6/2014 | Santos | F16K 99/0015 137/859 |
| 2014/0377099 A1* | 12/2014 | Hsueh | F04B 49/22 417/413.2 |
| 2015/0034847 A1* | 2/2015 | Kotani | F04B 45/047 251/57 |
| 2016/0076530 A1* | 3/2016 | Chen | F04B 45/047 417/413.2 |
| 2017/0058882 A1* | 3/2017 | Hirata | F04B 43/04 |
| 2017/0138357 A1 | 5/2017 | Kondo et al. | |
| 2017/0215744 A1* | 8/2017 | Kawamura | A61B 5/0235 |
| 2017/0218936 A1* | 8/2017 | Chen | F16K 99/0015 |
| 2017/0218937 A1* | 8/2017 | Chen | H01L 41/0973 |
| 2017/0218938 A1* | 8/2017 | Chen | F04B 53/10 |
| 2017/0218939 A1* | 8/2017 | Chen | F16K 99/0015 |
| 2017/0218940 A1* | 8/2017 | Chen | H01L 41/0973 |
| 2017/0218941 A1* | 8/2017 | Chen | F16K 99/0015 |
| 2017/0218942 A1* | 8/2017 | Chen | F16K 99/0015 |
| 2017/0219120 A1* | 8/2017 | Chen | F16K 99/0048 |
| 2017/0219121 A1* | 8/2017 | Chen | F16K 99/0048 |
| 2017/0222121 A1* | 8/2017 | Chen | H01L 41/09 |
| 2017/0222122 A1* | 8/2017 | Chen | F16K 99/0015 |
| 2017/0222123 A1* | 8/2017 | Chen | F16K 99/0048 |
| 2017/0222125 A1* | 8/2017 | Chen | F16K 99/0015 |
| 2018/0023715 A1* | 1/2018 | Wu | F04B 17/003 137/855 |
| 2018/0066649 A1* | 3/2018 | Han | F04B 45/047 |
| 2018/0066768 A1* | 3/2018 | Han | H02N 2/001 |
| 2018/0079088 A1* | 3/2018 | Takeuchi | F16K 7/17 |
| 2018/0128256 A1* | 5/2018 | Mou | H01L 41/0973 |
| 2018/0128262 A1* | 5/2018 | Mou | F16K 99/0015 |
| 2018/0128263 A1* | 5/2018 | Mou | H01L 41/0973 |
| 2018/0187669 A1* | 7/2018 | Liao | F16K 99/0048 |
| 2018/0187670 A1* | 7/2018 | Chen | F04B 45/047 |
| 2018/0187797 A1* | 7/2018 | Huang | F16K 99/0015 |
| 2018/0202428 A1* | 7/2018 | Mou | F04B 41/06 |
| 2018/0209409 A1* | 7/2018 | Liao | F04B 43/046 |
| 2018/0209410 A1* | 7/2018 | Chen | F04B 53/16 |
| 2018/0209411 A1* | 7/2018 | Chen | F04B 17/003 |
| 2018/0238320 A1* | 8/2018 | Liao | H01L 41/0986 |
| 2018/0331276 A1* | 11/2018 | Liao | F15B 5/006 |
| 2018/0368704 A1* | 12/2018 | Kawamura | F16K 7/00 |
| 2019/0055940 A1* | 2/2019 | Mou | B01D 46/10 |
| 2019/0063417 A1* | 2/2019 | Mou | F04B 53/20 |
| 2019/0063421 A1* | 2/2019 | Mou | G01N 33/0009 |
| 2019/0067550 A1* | 2/2019 | Mou | H01L 41/0973 |
| 2019/0085836 A1* | 3/2019 | Mou | F04B 45/047 |
| 2019/0085839 A1* | 3/2019 | Mou | F04B 39/10 |
| 2019/0085995 A1* | 3/2019 | Mou | F16K 31/005 |
| 2019/0099774 A1* | 4/2019 | Mou | B05B 17/0607 |
| 2019/0101111 A1* | 4/2019 | Mou | F04B 43/046 |
| 2019/0101220 A1* | 4/2019 | Mou | F04B 53/102 |
| 2019/0101938 A1* | 4/2019 | Mou | G05D 7/0694 |
| 2019/0101940 A1* | 4/2019 | Mou | F04B 41/06 |
| 2019/0125963 A1* | 5/2019 | Mou | A61M 5/14248 |
| 2019/0125965 A1* | 5/2019 | Mou | F04B 43/046 |
| 2019/0125967 A1* | 5/2019 | Mou | A61M 39/26 |
| 2019/0226471 A1* | 7/2019 | Mou | F16K 99/0055 |
| 2019/0302073 A1* | 10/2019 | Mou | H04M 1/035 |
| 2019/0302076 A1* | 10/2019 | Mou | G01N 33/004 |
| 2019/0331564 A1* | 10/2019 | Mou | G01N 33/0014 |
| 2019/0353157 A1* | 11/2019 | Mou | F16K 99/0057 |
| 2020/0052187 A1* | 2/2020 | Wu | H05K 1/189 |
| 2020/0139368 A1* | 5/2020 | Mou | F16K 99/0048 |
| 2020/0140264 A1* | 5/2020 | Mou | B81C 1/00071 |
| 2020/0191094 A1* | 6/2020 | Mou | B64D 27/02 |
| 2020/0217426 A1* | 7/2020 | Kawamura | F04B 53/106 |
| 2020/0224791 A1* | 7/2020 | Mou | B81C 1/00023 |
| 2020/0262545 A1* | 8/2020 | Mou | B64D 27/24 |
| 2020/0355278 A1* | 11/2020 | Kawamura | F04B 43/046 |
| 2021/0010467 A1* | 1/2021 | Fujisaki | F04B 43/023 |
| 2021/0017976 A1* | 1/2021 | Mou | F16K 99/0015 |
| 2021/0048012 A1* | 2/2021 | Mou | F04B 43/046 |
| 2021/0076755 A1* | 3/2021 | Mou | A41C 3/105 |
| 2021/0127987 A1* | 5/2021 | Mou | G01L 19/0007 |
| 2021/0127988 A1* | 5/2021 | Mou | A61B 5/0006 |
| 2021/0144884 A1* | 5/2021 | Mou | H05K 5/0213 |
| 2021/0215150 A1* | 7/2021 | Mou | F04B 53/001 |
| 2021/0296567 A1* | 9/2021 | Mou | H01L 41/332 |
| 2021/0332810 A1* | 10/2021 | Mou | F16K 7/00 |

* cited by examiner

THIN PROFILE GAS TRANSPORTING DEVICE

CROSS-REFERENCE TO RELATED APPLICATION

This non-provisional application claims priority under 35 U.S.C. § 119(a) to Patent Application No. 109136330 filed in Taiwan, R.O.C. on Oct. 20, 2020, the entire contents of which are hereby incorporated by reference.

BACKGROUND

Technical Field

The present disclosure relates to a thin profile gas transporting device, in particular, to a thin profile gas transporting device which is miniature, quiet, and capable of rapidly transmitting large volume of gas.

Related Art

In daily lives, for many equipment or apparatuses needed to be driven by fluids, conventional motors and fluid valves are usually provided for the purpose of fluid transmission. However, conventional motors and fluid valves produces noises during the operation, thereby leading the inconvenience and comfortableness in using the same. Especially, noises are prone to be produced in the gas relieving procedure.

Therefore, how to develop a device to improve and address above problem and to allow the equipment or apparatus driven by fluids to have a smaller size, to be miniaturized, to be quiet, to possess rapid fluid transmission performance, and to reduce noises upon pressure relieving, is an issue of concern recently.

SUMMARY

A general embodiment of the present disclosure provides a thin profile gas transporting device including a gas collecting plate, a valve sheet, a discharge sheet, and a gas pump. The gas collecting plate has a first convergence surface, a second convergence surface, a receiving trough, a convergence protrusion, a plurality of convergence holes, and a through hole. The second convergence surface is opposite to the first convergence surface. The receiving trough is recessed from the first convergence surface and has a receiving bottom surface. The convergence protrusion located is at the second convergence surface. The convergence holes are provided around the convergence protrusion. The through hole is spaced apart from the convergence holes. The valve sheet has a first valve surface, a second valve surface, a discharge valve, and a pressure relief valve. The first surface is attached to the second convergence surface. The second valve surface is opposite to the first valve surface. The discharge valve is vertically corresponding to the convergence holes. The discharge valve is recessed from the first valve surface and the second valve surface and has a valve hole misaligned with the convergence holes. The discharge valve is abutted against by the convergence protrusion, so that the valve hole is closed by the convergence protrusion. The pressure relief valve is vertically corresponding to the through hole and is recessed from the first valve surface and the second valve surface. The discharge sheet has a first discharge surface, a second discharge surface, a discharge trough, a pressure relief trough, a connection channel, a pressure relief protrusion, and a pressure relief channel. The first discharge surface is attached to the second valve surface. The second discharge surface is opposite to the first discharge surface. The discharge trough is recessed from the first discharge surface and vertically corresponding to the discharge valve. The discharge trough has a discharge hole vertically corresponding to the valve hole. The pressure relief trough is recessed from the first discharge surface and vertically corresponding to the pressure relief valve. The connection channel is recessed from the first discharge surface and in communication between the discharge trough and the pressure relief trough. The pressure relief protrusion is in the pressure relief trough and includes a plurality of pressure relief holes. The pressure relief channel is recessed from the second discharge surface and in communication with the pressure relief holes. The gas pump is disposed in the receiving trough of the gas collecting plate to transmit gas to the gas collecting plate. When the gas pump operates, the gas is introduced into the gas collecting plate and passes through the convergence holes and the through hole of the gas collecting plate to push the discharge valve and the pressure relief valve of the valve sheet, respectively. When the discharge valve is pushed by the gas, the discharge valve bends downward to detach from the convergence protrusion and open the valve hole, so that the gas enters into the discharge trough through the valve hole and is discharged out from the discharge hole of the discharge trough. When the pressure relief valve is pushed by the gas, the pressure relief valve bends downward to closely abut against the pressure relief protrusion and close the pressure relief holes, thereby preventing the gas from discharging out from the pressure relief holes through the connection channel.

BRIEF DESCRIPTION OF THE DRAWINGS

The disclosure will become more fully understood from the detailed description given herein below, for illustration only and thus not imitative of the disclosure, wherein.

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Figure 1:
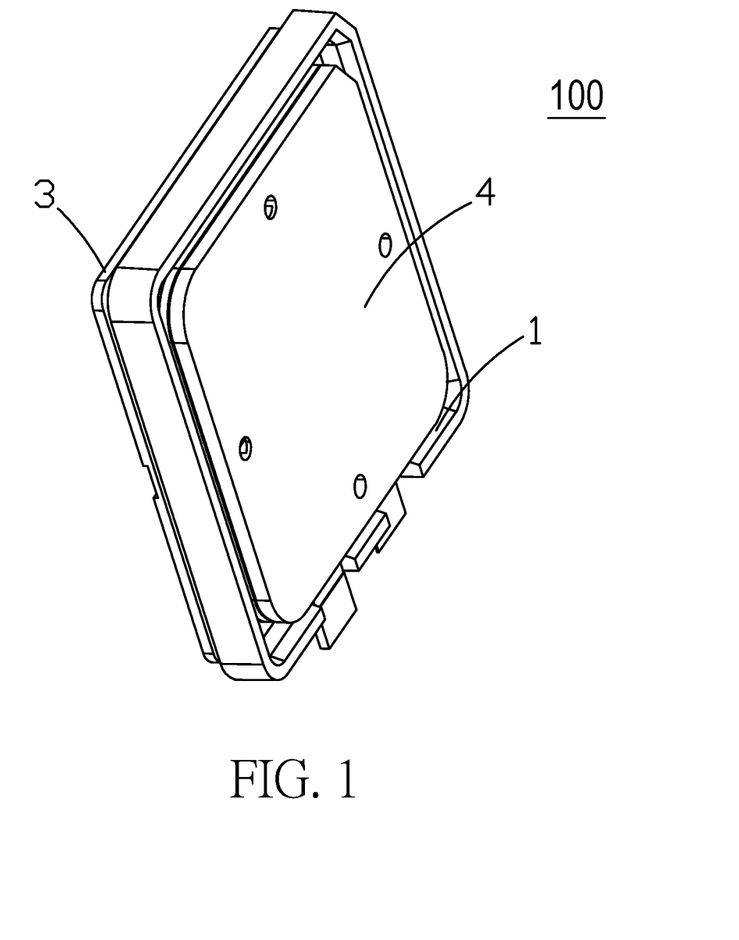
FIG. 1 illustrates a perspective view of a thin profile gas transporting device according to an exemplary embodiment of the present disclosure.
Figure 2A:
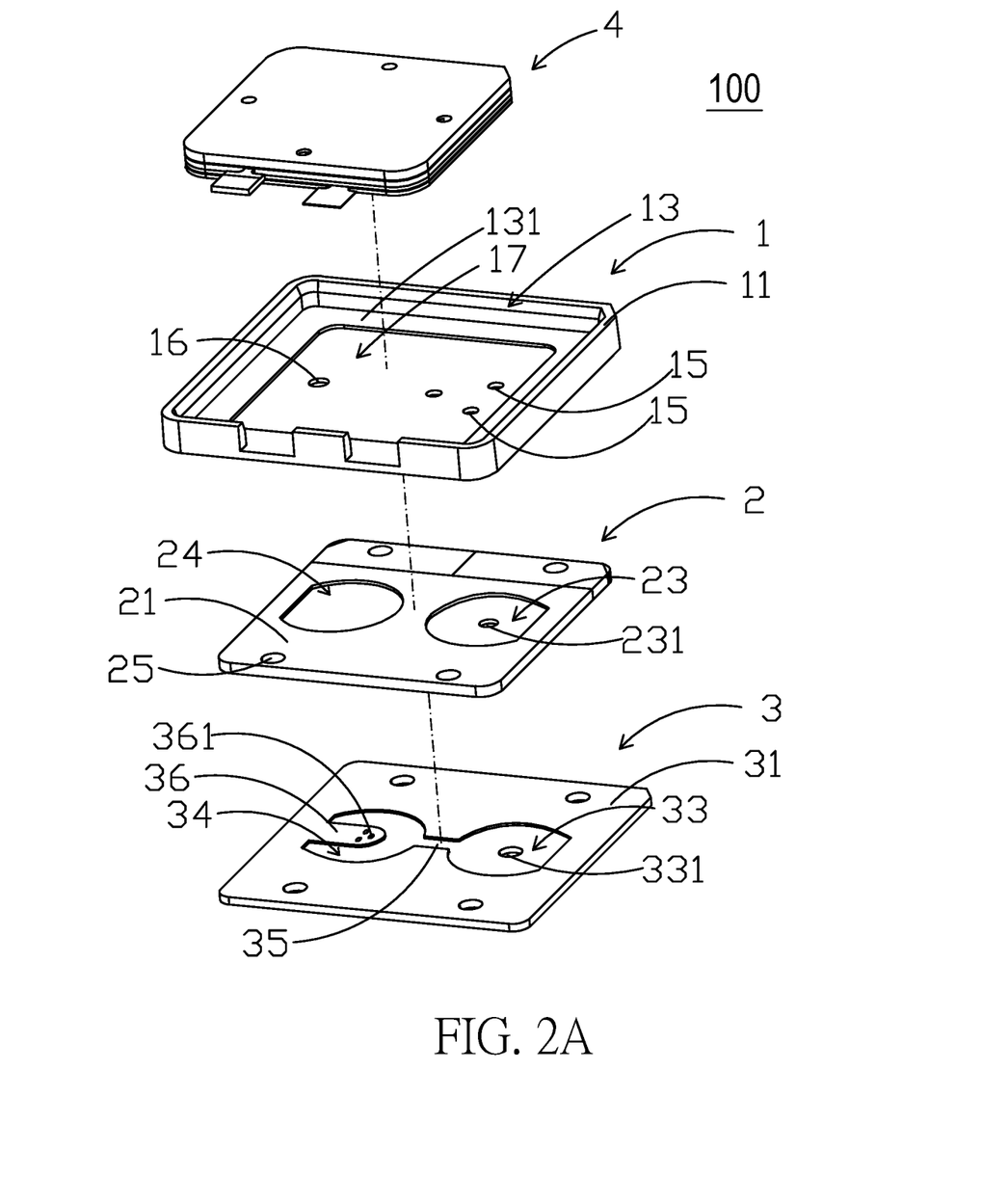
FIG. 2A illustrates an exploded view of the thin profile gas transporting device of the exemplary embodiment of the present disclosure.

Please refer to FIG. 1 and FIG. 2A. According to one or some embodiments of the present disclosure, a thin profile gas transporting device 100 including a gas collecting plate 1, a valve sheet 2, a discharge sheet 3, and a gas pump 4 is provided. The gas collecting plate 1, the valve sheet 2, and the discharge sheet 3 are stacked sequentially, and the gas pump 4 is disposed on the gas collecting plate 1 to provide gas transmission. Therefore, a thin profile gas transporting device 100 capable of transmitting gas can be provided.

Figure 2B:
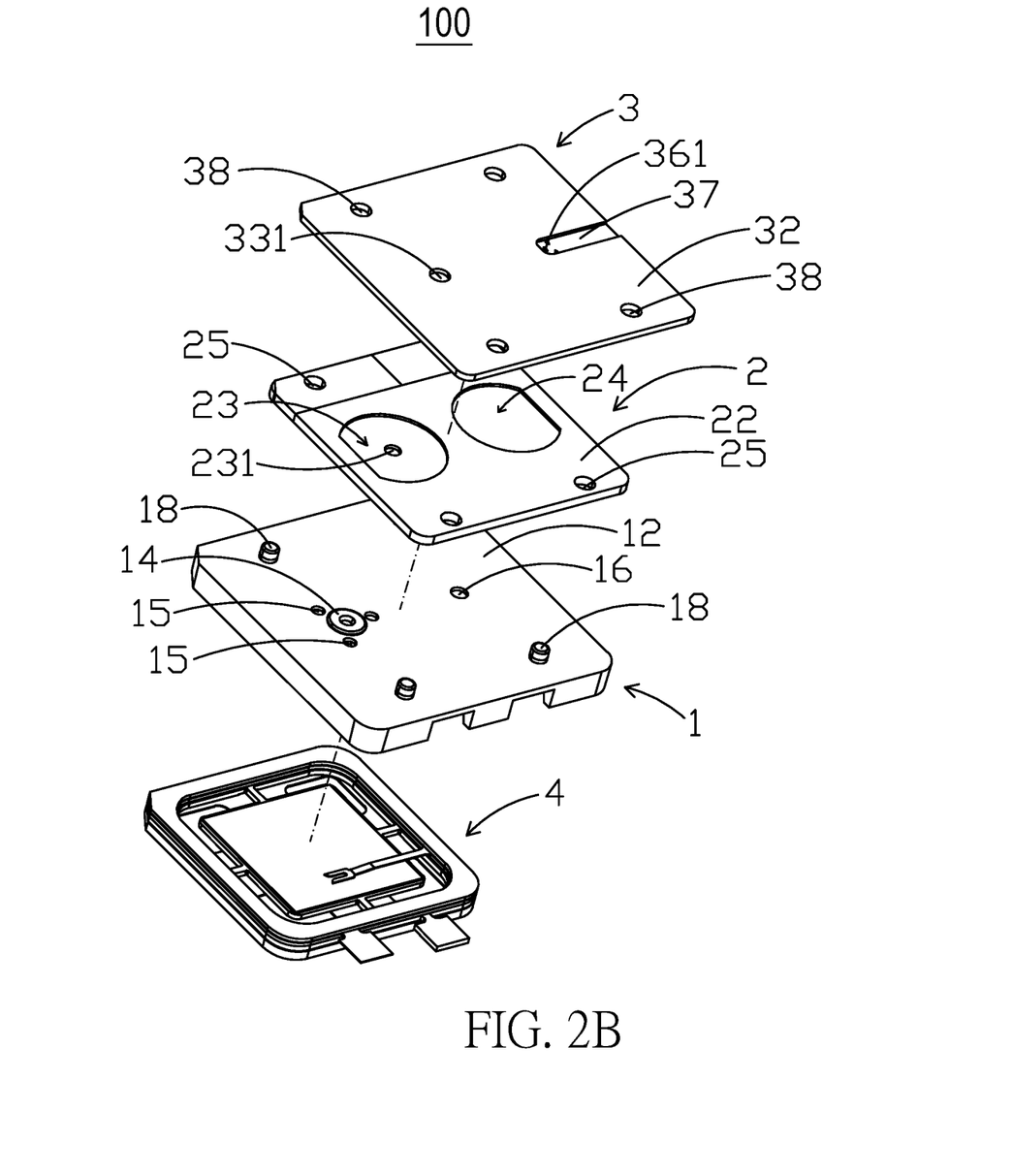
FIG. 2B illustrates another exploded view of the thin profile gas transporting device of the exemplary embodiment of the present disclosure from another view angle.

As shown in FIG. 2A and FIG. 2B, the gas collecting plate 1 has a first convergence surface 11, a second convergence surface 12, a receiving trough 13, a convergence protrusion 14, a plurality of convergence holes 15, a through hole 16, and a convergence trough 17. The first convergence surface 11 is opposite to the second convergence surface 12. The receiving trough 13 is recessed from the first convergence surface 11 and has a receiving bottom surface 131. The convergence protrusion 14 is located at the second convergence surface 12, and the convergence protrusion 14 vertically protrudes from the second convergence surface 12. The convergence holes 15 are provided around the convergence protrusion 14; the number of the convergence holes 15 in the figure is exemplified by three, but not limited thereto. The through hole 16 is spaced apart from the convergence holes 15 and the convergence protrusion 14. The convergence trough 17 is recessed from the receiving bottom surface 131 and is in communication with the convergence holes 15 and the through hole 16, respectively.

The valve sheet 2 has a first valve surface 21, a second valve surface 22, a discharge valve 23, and a pressure relief valve 24. The first valve surface 21 is opposite to the second valve surface 22. The first valve surface 21 of the valve sheet 2 is attached to the second convergence surface 12 of the gas collecting plate 1. The discharge valve 23 is vertically corresponding to the convergence holes 15. The thickness of the discharge valve 23 is less than the thickness of the valve sheet 2, and the discharge valve 23 is recessed from the first valve surface 21 and the second valve surface 22. The discharge valve 23 has a valve hole 231 vertically corresponding to the convergence protrusion 14 of the gas collecting plate 1, and the valve hole 231 is misaligned with the convergence holes 15. The pressure relief valve 24 is vertically corresponding to the through hole 16. The thickness of the pressure relief valve 24 is less than the thickness of the valve sheet 2, and the pressure relief valve 24 is recessed from the first valve surface 21 and the second valve surface 22.

The discharge sheet 3 has a first discharge surface 31, a second discharge surface 32, a discharge trough 33, a pressure relief trough 34, a connection channel 35, a pressure relief protrusion 36, and a pressure relief channel 37. The first discharge surface 31 is opposite to the second discharge surface 32, and the first discharge surface 31 is attached to the second valve surface 22 of the valve sheet 2. The discharge trough 33 is vertically corresponding to the discharge valve 23 of the valve sheet 2 and is recessed from the first discharge surface 31. The discharge trough 33 has a discharge hole 331 vertically corresponding to the valve hole 231. The pressure relief trough 34 is recessed from the first discharge surface 31 and vertically corresponding to the pressure relief valve 24. The connection channel 35 is recessed from the first discharge surface 31 and between the discharge trough 33 and the pressure relief trough 34, so as to allows the communication between the discharge trough 33 and the pressure relief trough 34. The pressure relief protrusion 36 is in the pressure relief trough 34 and includes a plurality of pressure relief holes 361. The pressure relief channel 37 is recessed from the second discharge surface 32; one of two ends of the pressure relief channel 37 is in communication with the pressure relief holes 361, and the other end of the pressure relief channel 37 extends to the edge of the discharge sheet 3.

Please still refer to FIG. 2A. In this embodiment, the thin profile gas transporting device includes a plurality of the pressure relief holes 361. In this embodiment, the number of the pressure relief holes 361 is exemplified by three, but not limited thereto; the number of the pressure relief holes 361 may be in the range between three and twelve. Moreover, the pressure relief holes 361 may be arranged as a triangle, a rectangle, a polygon, an arc, a circle, an array, or the like. Moreover, the diameter of the pressure relief holes 361 is within the range between 0.1 mm and 1 mm. In this embodiment, the number of the pressure relief holes 361 is exemplified by three, and the diameter of the pressure relief holes 361 is 0.8 mm. Therefore, in this embodiment, the pressure relief holes 361 not only allow discharging rapidly but also reduce the noise during the pressure relief operation, thereby achieving the effect of noise elimination.

The gas pump 4 is disposed on the receiving bottom surface 131 of the receiving trough 13 to cover the convergence trough 17, so that the gas is introduced into the convergence trough 17. Please refer to FIG. 3A and FIG. 3B. The gas pump 4 is formed by sequentially stacking an inlet plate 41, a resonance sheet 42, a piezoelectric actuator 43, a first insulation sheet 44, a conductive sheet 45, and a second insulation sheet 46 with each other. The inlet plate 41 has at least one inlet hole 41a, at least one convergence channel 41b, and a convergence chamber 41c. The inlet hole 41a is used to introduce the gas outside the gas pump 4 to flow into the gas pump 4. The inlet hole 41a correspondingly penetrates the inlet plate 41 into convergence channel 41b, and the convergence channel 41b is converged into the convergence chamber 41c, so that the gas introduced from the inlet hole 41a can be converged into the convergence chamber 41c. In this embodiment, the number of the inlet holes 41a and the number of the convergence channels 41b are the same. Moreover, in this embodiment, the number of the inlet holes 41a and the number of the convergence channels 41b both are exemplified by four, respectively, but not limited thereto. The four inlet holes 41a respectively penetrate into the four convergence channels 41b, and the four convergence channels 41b are converged into the convergence chamber 41c.

Figure 3A:
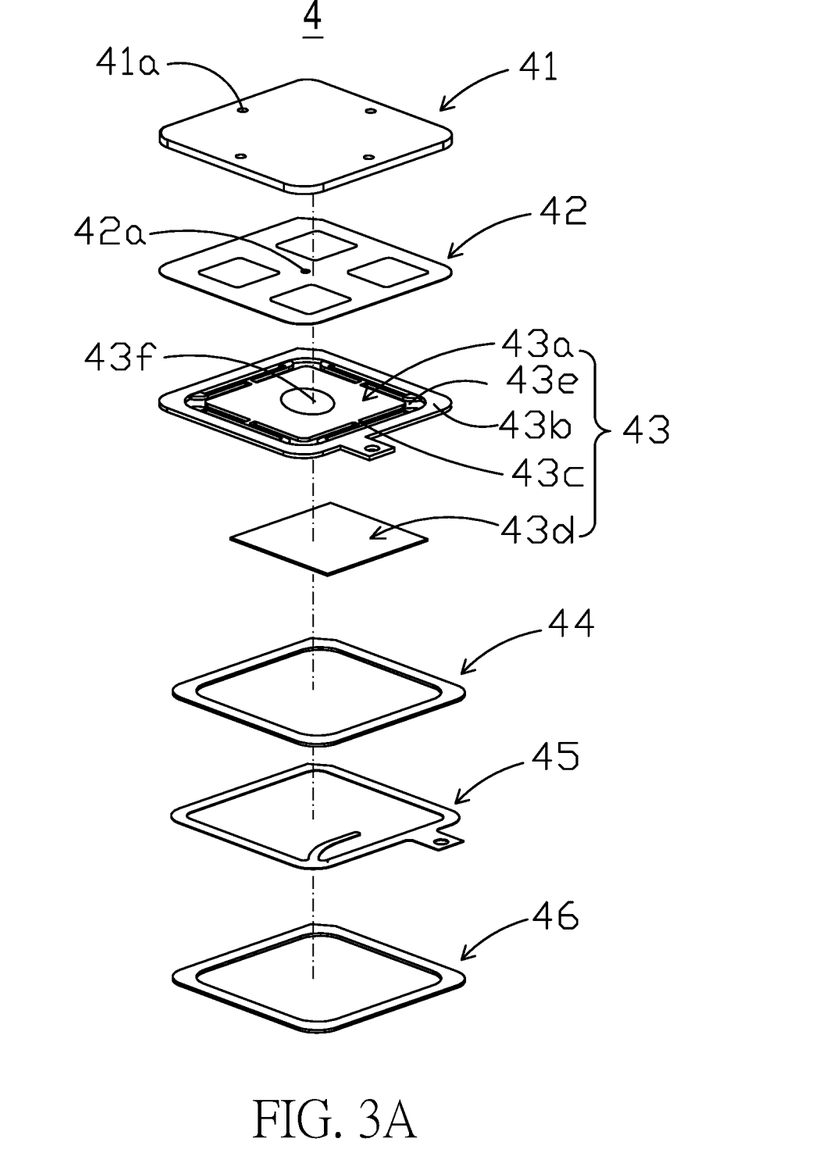
FIG. 3A illustrates an exploded view of a gas pump of the thin profile gas transporting device of the exemplary embodiment of the present disclosure.
Figure 3B:
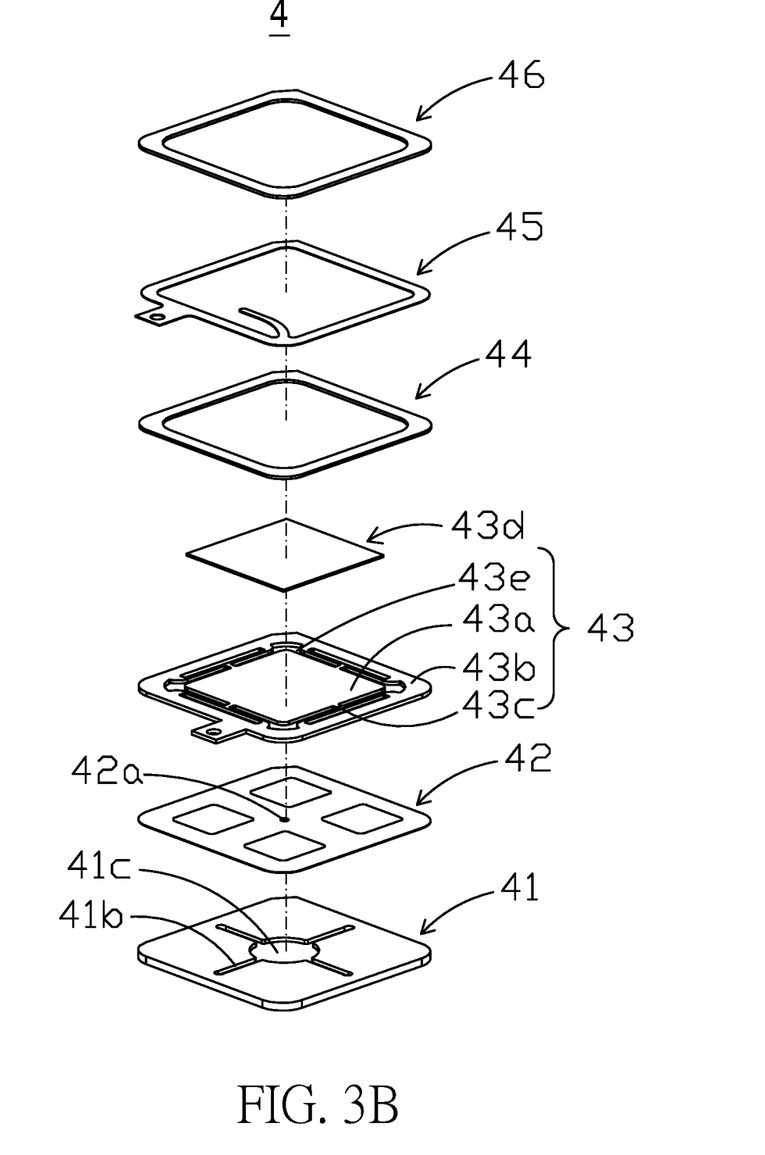
FIG. 3B illustrates another exploded view of the gas pump of the thin profile gas transporting device of the exemplary embodiment of the present disclosure from another view angle.
Figure 4A:
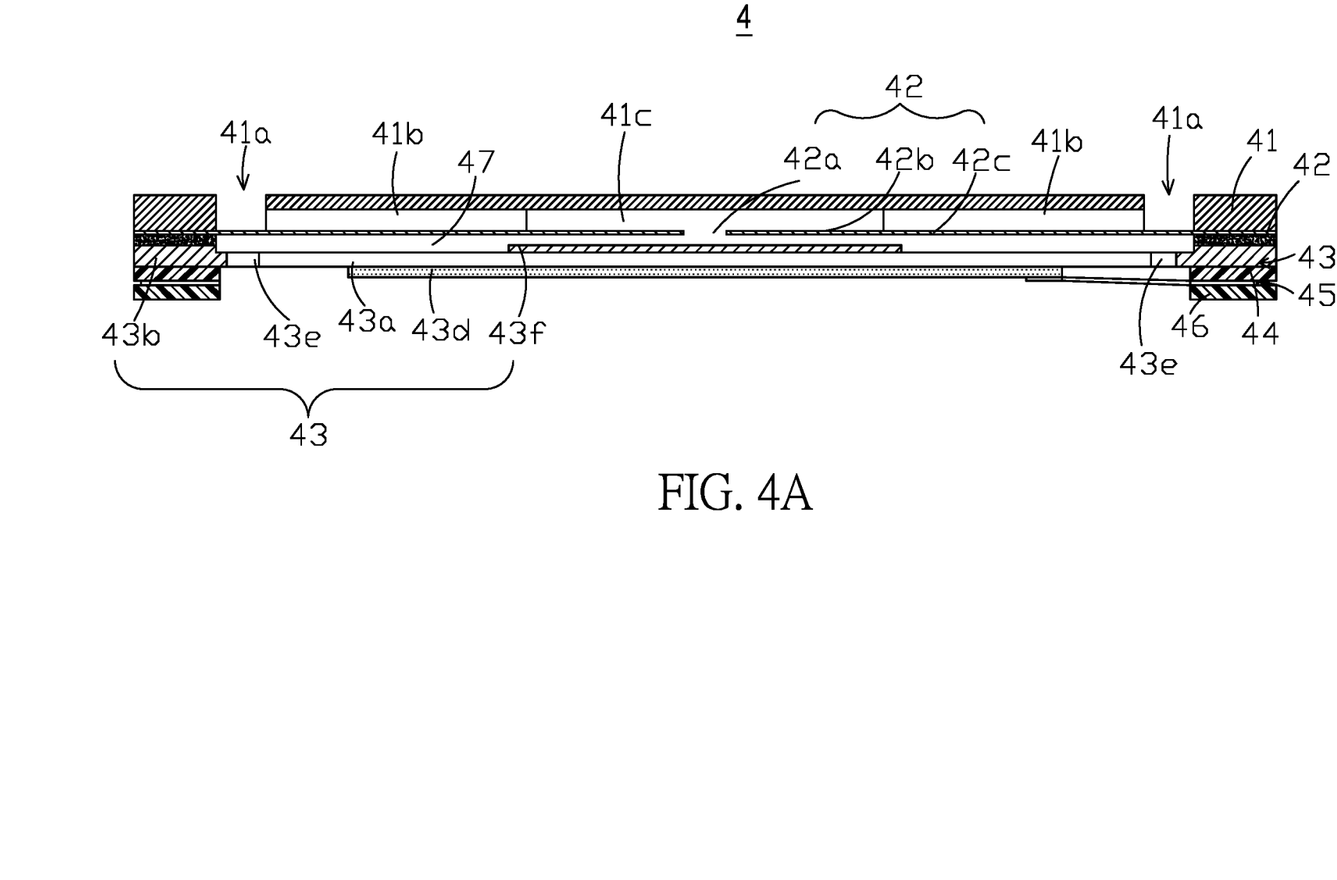
FIG. 4A illustrates a cross-sectional view of the gas pump of the thin profile gas transporting device of the exemplary embodiment of the present disclosure.

Please refer to FIG. 3A, FIG. 3B, and FIG. 4A. The resonance sheet 42 may be attached to and assembled on the inlet plate 41. Furthermore, the resonance sheet 42 has a perforation 42a, a movable portion 42b, and a fixed portion 42c. The perforation 42a is located at a center portion of the resonance sheet 42 and corresponds to the convergence chamber 41c of the inlet plate 41. The movable portion 42b is disposed at a periphery of the perforation 42a and is disposed at a portion corresponding to the convergence chamber 41c. The fixed portion 42c is disposed at an outer periphery of the resonance sheet 42 and attached to the inlet plate 41.

Please still refer to FIG. 3A, FIG. 3B, and FIG. 4A. The piezoelectric actuator 43 attached to and disposed correspondingly to the resonance sheet 42 includes a suspension plate 43a, an outer frame 43b, at least one supporting element 43c, a piezoelectric element 43d, at least one gap 43e, and a protruding portion 43f In the embodiments of the present disclosure, the suspension plate 43a is in square shape. It is understood that, the reason why the suspension plate 43a adopts the square shape is that, comparing with a circle suspension plate having a diameter equal to the side length of the square suspension plate 43a, the square suspension plate 43a has an advantage of saving electricity power. The power consumption of a capacities load operated at a resonance frequency may increase as the resonance frequency increases, and since the resonance frequency of a square suspension plate 43a is much lower than that of a circular suspension plate, the power consumption of the square suspension plate 43a is relatively low as well. Consequently, the square design of the suspension plate 43a used in one or some embodiments of the present disclosure has the benefit of power saving. In the embodiments of the present disclosure, the outer frame 43b is disposed around the periphery of the suspension plate 43a. The at least one supporting element 43c is formed between the suspension plate 43a and the outer frame 43b to provide a flexible support for the suspension plate 43a. In the embodiments of the present disclosure, the piezoelectric element 43d has a side length, which is shorter than or equal to a side length of the suspension plate 43a. The piezoelectric element 43d is attached to a surface of the suspension plate 43a so as to drive the suspension plate 43a to bend and vibrate when the piezoelectric element 43d is applied with a voltage. There is at least one gap 43e formed between the suspension plate 43a, the outer frame 43b, and the at least one supporting element 43c for the gas to flow therethrough. The protruding portion 43f is disposed on a surface of the suspension plate 43a opposite to the surface of the suspension plate 43a where the piezoelectric element 43d is attached. In this embodiment, the protruding portion 43f may be a convex structure protruding out from and integrally formed with the surface of the suspension plate 43a opposite to the surface of the suspension plate 43a where the piezoelectric element 43d is attached by performing an etching process on the suspension plate 43a.

Please still refer to FIG. 3A, FIG. 3B, and FIG. 4A. In this embodiment, the inlet plate 41, the resonance sheet 42, the piezoelectric actuator 43, the first insulation plate 44, the conductive plate 45, and the second insulation plate 46 are stacked and assembled sequentially, and a chamber space 47 is formed between the suspension plate 43a of the piezoelectric actuator 43 and the resonance sheet 42. The chamber space 47 can be formed by filling a material, such as conductive adhesive, in the space between the resonance sheet 42 and the outer frame 43b of the piezoelectric actuator 43, but not limited thereto, thereby maintaining a certain distance between the resonance sheet 42 and a surface of the suspension plate 43a to form the chamber space 47 so as to allow the gas to be guided to and flow more quickly. Further, since an appropriate distance is maintained between the suspension plate 43a and the resonance sheet 42, the interference raised by the contact between the suspension plate 43a and the resonance sheet 42 can be reduced, so that the noise generated thereby can be reduced as well. In other embodiments, the required thickness of filling the conductive adhesive between the resonance sheet 42 and the outer frame 43b of the piezoelectric actuator 43 can be decreased by increasing the height of the outer frame 43b of the piezoelectric actuator 43. Accordingly, the entire structure of the gas pump 4 would not be indirectly affected since the filling material of conductive adhesive might be influenced by the hot pressing temperature and the cooling temperature, thereby avoiding the situation that the actual spacing of the chamber space 47 is affected by the thermal expansion and contraction of the filling material of the conductive adhesive, but not limited thereto. Moreover, the height of the chamber space 47 also affects the transmission efficiency of the gas pump 4. Therefore, it is important to maintain a fixed height of the chamber space 47 for the purpose of achieving stable transmission efficiency of the gas pump 4.

Figure 4B:
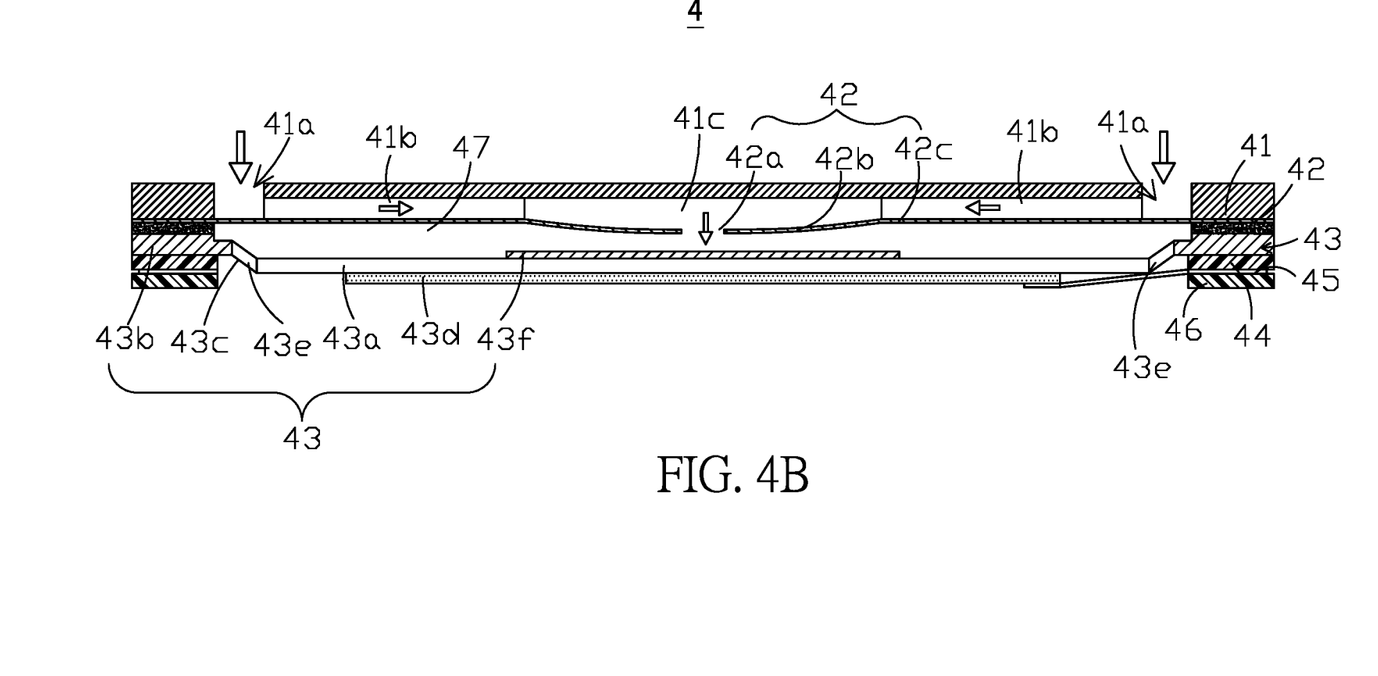
FIG. 4B to FIG. 4D illustrate schematic cross-sectional views showing the operation steps of the gas pump of the exemplary embodiment of the present disclosure.
Figure 4C:
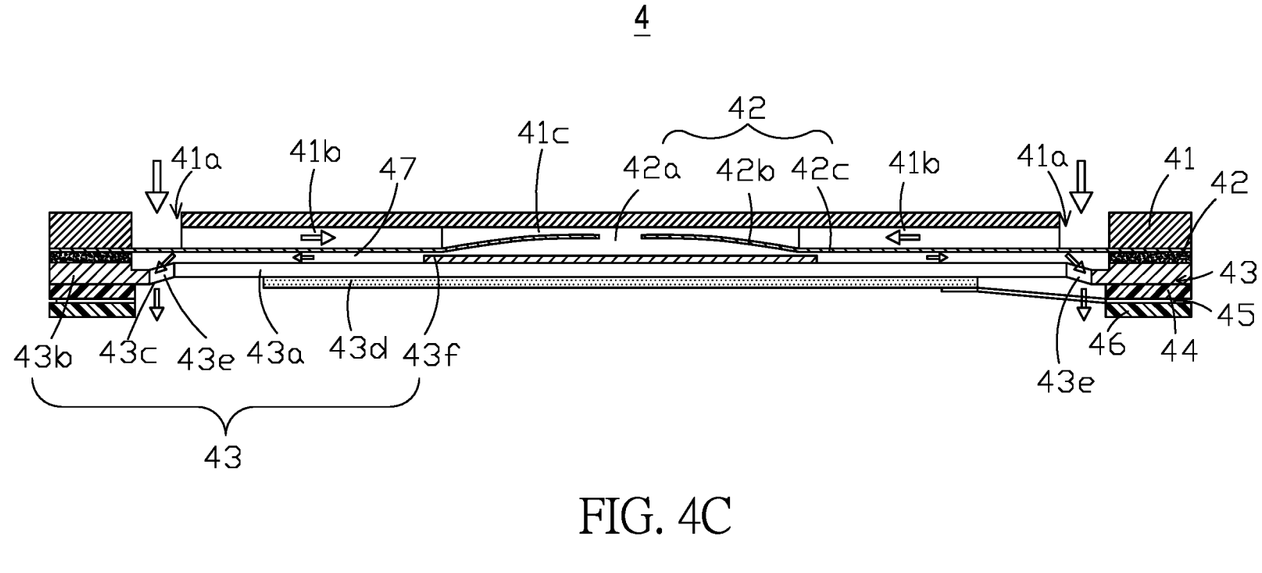
Figure 4D:
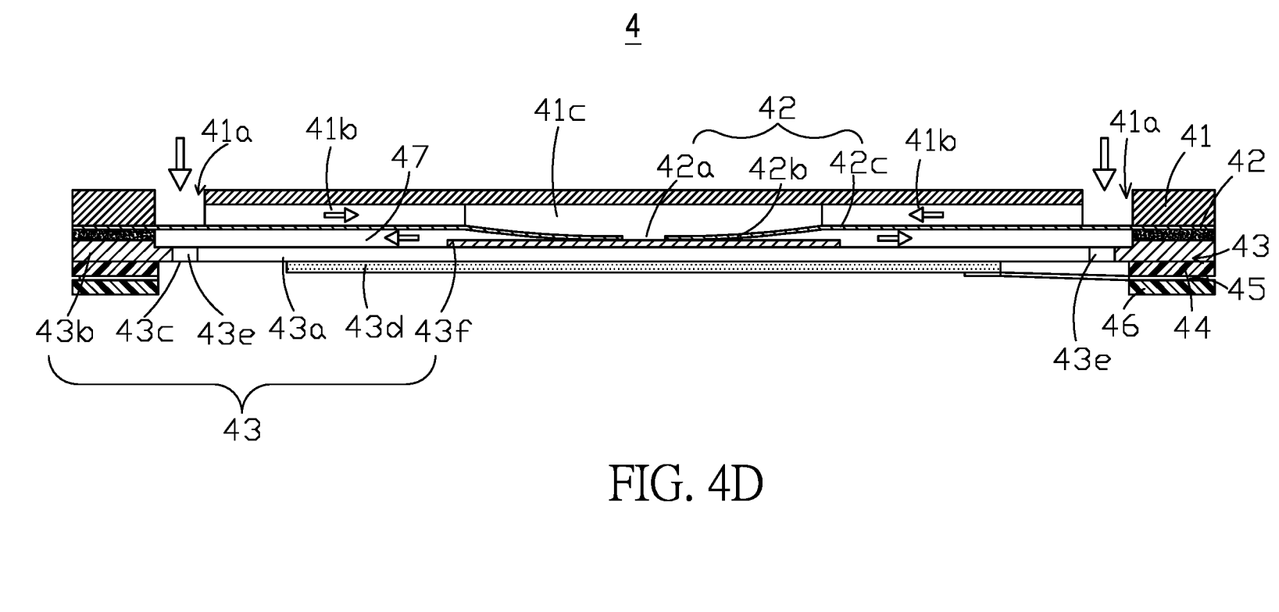

In order to understand the operation steps of the aforementioned gas pump 4 in gas transmitting procedure, please refer to FIG. 4B to FIG. 4D. Please refer to FIG. 4B first, the piezoelectric element 43d of the piezoelectric actuator 43 deforms after being applied with a driving voltage, and the piezoelectric element 43d drives the suspension plate 43a to move downward and to move away from the inlet plate 41. Thus, the volume of the chamber space 47 is increased and a negative pressure is generated inside the chamber space 47, thereby drawing the gas into the convergence chamber 41c and enter into the chamber space 47. At the same time, owing to the resonance effect, the resonance sheet 42 moves downward and moves away from the inlet plate 41 at the same time, and increases the volume of the convergence chamber 41c. Furthermore, since the gas inside the convergence chamber 41c is drawn into the chamber space 47, the convergence chamber 41c is in a negative pressure state as well, and the gas can be drawn into the convergence chamber 41c through the inlet hole 41a and the convergence channel 41b. Then, please refer to FIG. 4C. The piezoelectric element 43d drives the suspension plate 43a to move upwardly to move toward the inlet plate 41 and compresses the chamber space 47. Similarly, since the resonance sheet 42 resonates with the suspension plate 43a, the resonance sheet 42 also moves upwardly and moves toward the inlet plate 41, thereby pushing the gas in the chamber space 47 to move downward and transmit out of the gas pump 4 through the at least one gap 43e so as to achieve gas transmission. Last but not least, please refer to FIG. 4D. When the suspension plate 43a moves resiliently to its original position, the resonance sheet 42 still moves downward and moves away from the inlet plate 41 due to its inertia momentum. At this time, the resonance sheet 42 compresses the chamber space 47, so that the gas in the chamber space 47 is moved toward the gap 43e and the volume of the convergence chamber 41c is increased. Accordingly, the gas can be drawn into the convergence chamber 41c continuously through the inlet holes 41a and the convergence channels 41b and can be converged at the convergence chamber 41c. Through continuously repeating the operation steps of the gas pump 4 shown in FIG. 4B to FIG. 4D, the gas pump 4 can make the gas continuously enter into the flow paths formed by the inlet plate 41 and the resonance sheet 42 from the inlet holes 41a, thereby generating a pressure gradient. The gas is then transmitted outward through the gap 43e. As a result, the gas can flow at a relatively high speed, thereby achieving the effect of gas transmission of the gas pump 4.

Figure 5A:
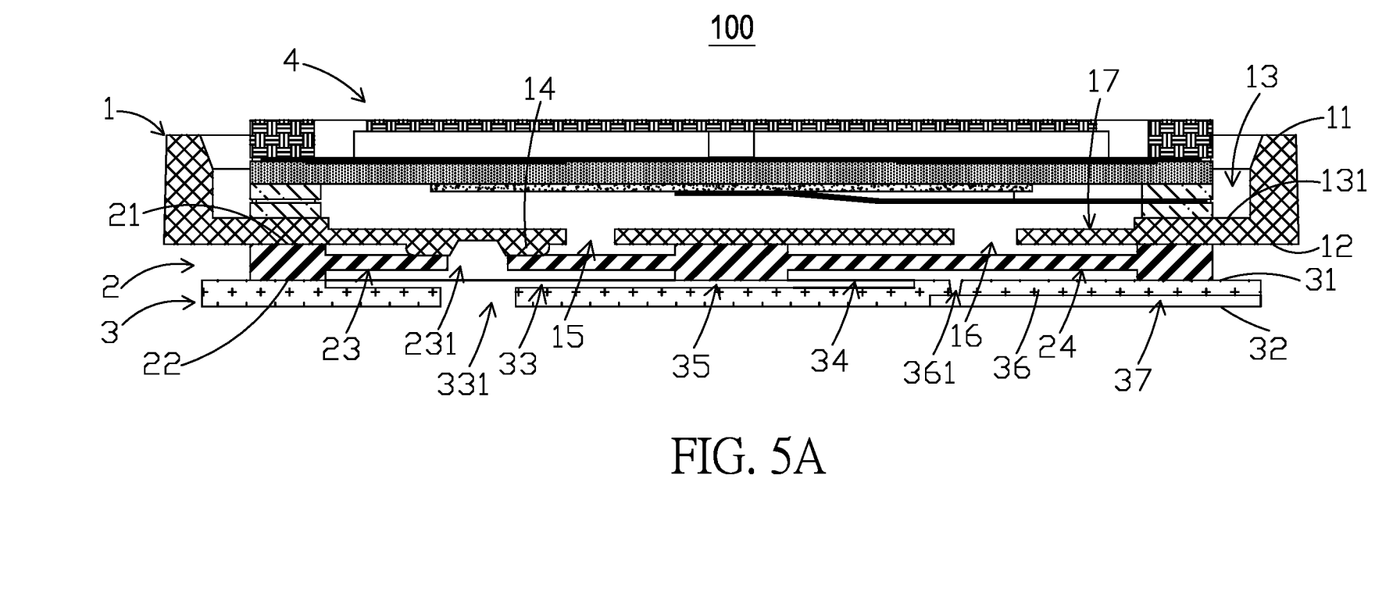
FIG. 5A illustrates a cross-sectional view of the thin profile gas transporting device of the exemplary embodiment of the present disclosure.

Please refer to FIG. 5A. FIG. 5A illustrates a cross-sectional view of the thin profile gas transporting device of the exemplary embodiment. The gas collecting plate 1, the valve sheet 2, and the discharge sheet 3 are sequentially stacked, and the gas pump 4 is disposed on the receiving bottom surface 131 which is in the receiving trough 13 of the gas collecting plate 1 to cover the convergence trough 17. The structure and the operation steps of the gas pump 4 have already been described above and will not be reiterated here.

Figure 5B:
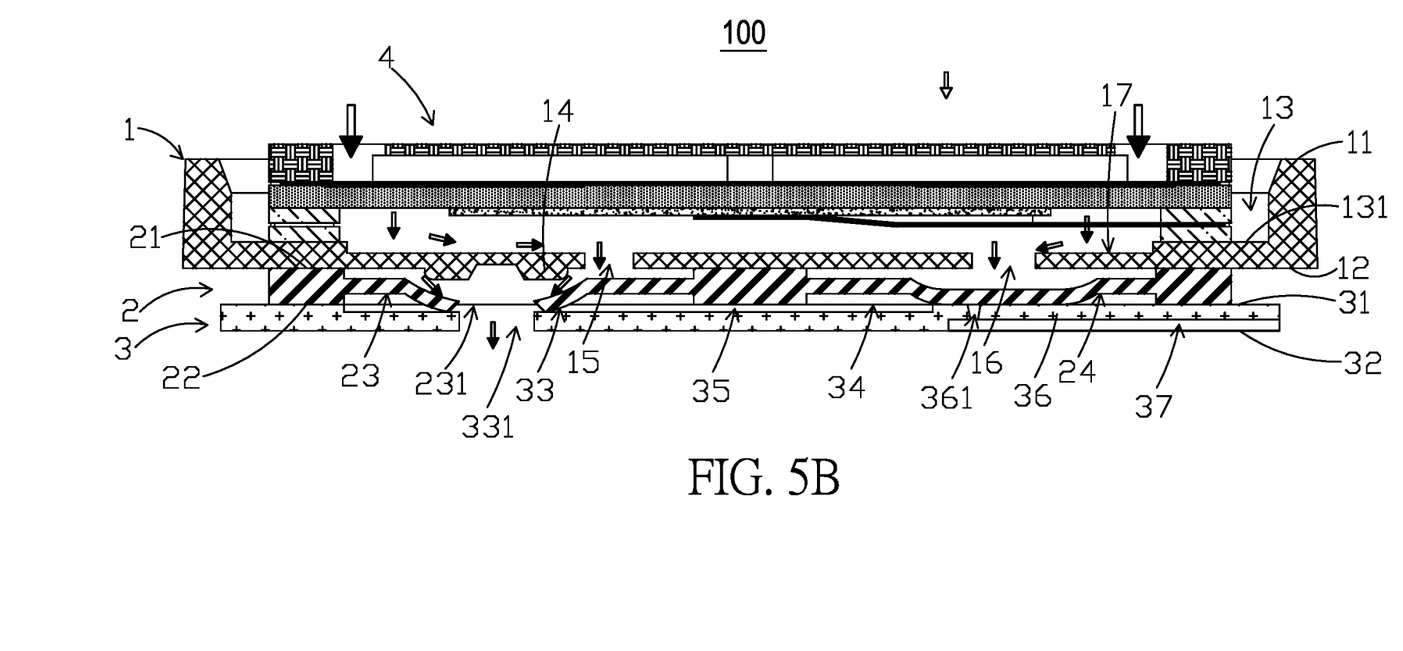
FIG. 5B illustrates a schematic cross-sectional view showing the discharging operation of the thin profile gas transporting device of the exemplary embodiment of the present disclosure.

Please refer to FIG. 5B. When the gas pump 4 is driven, the gas pump 4 introduces the gas into the convergence trough 17, and the gas in the convergence trough 17 passes through the convergence holes 15 and the through hole 16 respectively and encounters the valve sheet 2. The gas passing through the convergence holes 15 pushes the discharge valve 23 of the valve sheet 2 downward to bend the discharge valve 23, so that the discharge valve 23 detaches from the convergence protrusion 14 to open the valve hole 231. Therefore, the gas can flow toward the discharge sheet 3 through the valve hole 231 to enter into the discharge trough 33 of the discharge sheet 3 and to be discharged out from the discharge hole 331, thereby completing the gas transmitting operation. On the other hand, the gas passing through the through hole 16 pushes and bends the pressure relief valve 24 of the valve sheet 2. The pressure relief valve 24 then bends downward to abut against the pressure relief protrusion 36 of the discharge sheet 3 and close the pressure relief holes 361. Hence, when the gas in the discharge trough 33 enters into the pressure relief trough 34 through the connection channel 35, the gas will not be discharged out from the pressure relief holes 361, so as to avoid the issues of gas diversion, insufficient gas flow amount, or insufficient gas pressure.

Figure 5C:
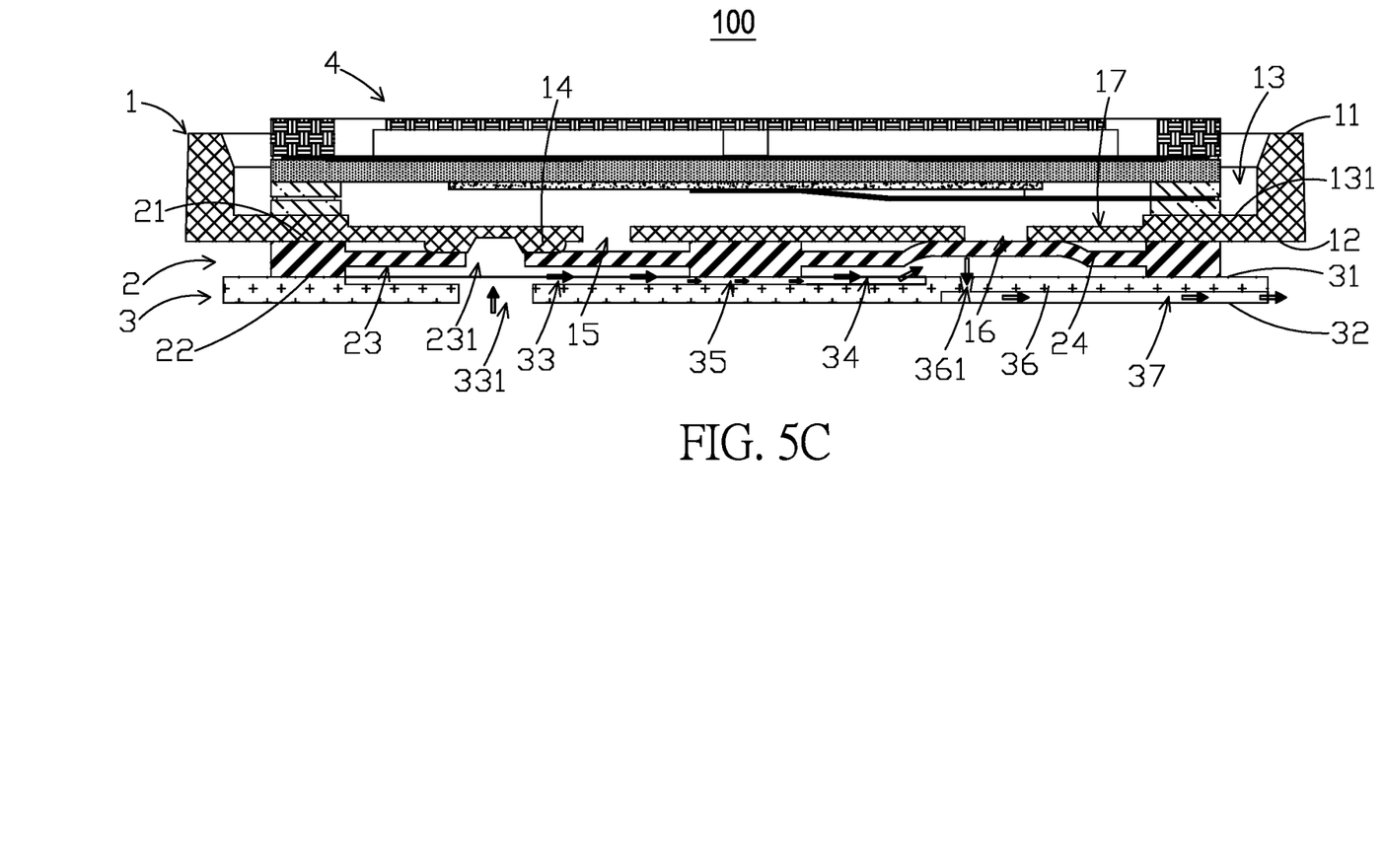
FIG. 5C illustrates a schematic cross-sectional view showing the pressure relieving operation of the thin profile gas transporting device of the exemplary embodiment of the present disclosure.

Please still refer to FIG. 5C, a schematic cross-sectional view showing the pressure relieving operation of the thin profile gas transporting device 100 of the exemplary embodiment is illustrated. The gas flows back to the discharge trough 33 of the discharge sheet 3 from the discharge hole 331, and the gas pushes the discharge valve 23 of the valve sheet 2 upwardly, so that the convergence protrusion 14 closely abuts against the discharge valve 23 to close the valve hole 231, thus preventing the gas from flowing toward the gas collecting plate 1 through the valve hole 231. Moreover, the gas in the discharge trough 33 enters into the pressure relief trough 34 through the connection channel 35 to slightly push the pressure relief valve 24 upwardly, thereby increasing the volume between the pressure relief valve 24 and the pressure relief protrusion 36 and increasing the amount of the gas entering into the pressure relief holes 361. Hence, the gas is introduced into the pressure relief channel 37 from the pressure relief holes 361 and is discharged out from the pressure relief channel 37, thus completing the pressure relieving operation.

Moreover, please further refer to FIG. 2B. The second convergence surface 12 of the gas collecting plate 1 has at least one latch 18, the valve sheet 2 has at least one positioning hole 25, and the valve sheet 3 has at least one fixation hole 38. The number and the position of the positioning hole 25 and the fixation hole 38 correspond to the number and the position of the latch 18. In this embodiment, the number of the latches 18, the number of the positioning holes 25, and the number of the fixation holes 38 are all four, but not limited thereto. The latches 18 respectively pass through the positioning holes 25 and the fixation holes 38 for providing positioning and fixation functions.

As discussed above, in the thin profile gas transporting device of one of some embodiments of the present disclosure, the structures of the gas collecting plate and the discharge sheet are simplified, and effectively reducing the thickness of the gas collecting plate, the manufacturing time and costs, and gas transmission time at the same time, so as to increasing the transmission efficiency. Moreover, through the arrangement of the pressure relief holes with small hole diameters, the pressure relief operation can be performed more rapidly and quietly. Accordingly, in one or some embodiments, a device with miniaturized size, quiet, and capable of performing a high volume of fluid transmission rapidly can be obtained.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A thin profile gas transporting device, comprising:
    a gas collecting plate having:
        a first convergence surface;
        a second convergence surface opposite to the first convergence surface;
        a receiving trough recessed from the first convergence surface and having a receiving bottom surface;
        a convergence protrusion located at the second convergence surface;
        a plurality of convergence holes provided around the convergence protrusion; and
        a through hole spaced apart from the convergence holes;
    a valve sheet having:
        a first valve surface attached to the second convergence surface;
        a second valve surface opposite to the first valve surface;
        a discharge valve vertically correspondingly to the convergence holes, wherein the discharge valve is recessed from the first valve surface and the second valve surface and has a valve hole misaligned with the convergence holes; the discharge valve is abutted against by the convergence protrusion so that the valve hole is closed by the convergence protrusion; and
        a pressure relief valve corresponding to the through hole, wherein the pressure relief valve is recessed from the first valve surface and the second valve surface;
    a discharge sheet having:
        a first discharge surface attached to the second valve surface;
        a second discharge surface opposite to the first discharge surface;
        a discharge trough recessed from the first discharge surface and vertically corresponding to the discharge valve, wherein the discharge trough has a discharge hole vertically corresponding to the valve hole;

a pressure relief trough recessed from the first discharge surface and vertically corresponding to the pressure relief valve;
a connection channel recessed from the first discharge surface and in communication between the discharge trough and the pressure relief trough;
a pressure relief protrusion in the pressure relief trough and comprising a plurality of pressure relief holes; and
a pressure relief channel recessed from the second discharge surface and in communication with the pressure relief holes; and
a gas pump disposed in the receiving trough of the gas collecting plate which transmits gas to the gas collecting plate;
wherein when the gas pump operates; the gas is introduced into the gas collecting plate and passes through the convergence holes and the through hole of the gas collecting plate pushes the discharge valve and the pressure relief valve of the valve sheet, respectively; and when the discharge valve is pushed by the gas the discharge valve bends so that the discharge valve detaches from the convergence protrusion and opens the valve hole so that the gas enters into the discharge trough through the valve hole and is discharged out from the discharge hole of the discharge trough; and when the pressure relief valve is pushed by the gas the pressure relief valve bends so that the pressure relief valve abuts against the pressure relief protrusion and closes the pressure relief holes, thereby preventing the gas from discharging out from the pressure relief holes through the connection channel.

2. The thin profile gas transporting device according to claim 1, wherein the gas collecting plate further comprises a convergence trough recessed from the receiving bottom surface and in communication with the convergence holes and the through hole, respectively, wherein the gas pump is disposed on the receiving bottom surface of the receiving trough covers the convergence trough.

3. The thin profile gas transporting device according to claim 2, wherein the gas pump comprises:
an inlet plate having at least one inlet hole, at least one convergence channel, and a convergence chamber, wherein the at least one inlet hole introduces the gas into the gas pump, the at least one inlet hole correspondingly penetrates into the at least one convergence channel and the at least one convergence channel is converged into the convergence chamber so that the gas introduced from the at least one inlet hole is converged into the convergence chamber;
a resonance sheet attached to the inlet plate, wherein the resonance sheet has a perforation, a movable portion, and a fixed portion, wherein the perforation is located at a center portion of the resonance sheet and corresponds to the convergence chamber of the inlet plate, the movable portion is disposed at a periphery of the perforation and is disposed at a portion corresponding to the convergence chamber, and the fixed portion is disposed at an outer periphery of the resonance sheet and attached to the inlet plate; and
a piezoelectric actuator attached to the resonance sheet and disposed correspondingly to the resonance sheet;
wherein a chamber space is formed between the resonance sheet and the piezoelectric actuator, so that when the piezoelectric actuator is driven the gas outside the gas pump is introduced into the gas pump through the at least one inlet hole of the inlet plate, converged into the convergence chamber via the at least one convergence channel, flowed through the perforation of the resonance sheet, and transmitted outwardly by a resonance effect resulting between the piezoelectric actuator and the movable portion of the resonance sheet.

4. The thin profile gas transporting device according to claim 3, wherein the piezoelectric actuator comprises:
a suspension plate in square shape and capable of bending and vibrating;
an outer frame disposed around a periphery of the suspension plate;
at least one supporting element formed between the suspension plate and the outer frame to provide a flexible support for the suspension plate; and
a piezoelectric element having a side length, wherein the side length of the piezoelectric element is smaller than or equal to a side length of the suspension plate, and the piezoelectric element is attached to a surface of the suspension plate and vibrates when the piezoelectric element is applied with a voltage.

5. The thin profile gas transporting device according to claim 4, wherein the gas pump further comprises a first insulation sheet, a conductive sheet, and a second insulation sheet, and wherein the inlet plate, the resonance sheet, the piezoelectric actuator, the first insulation sheet, the conductive sheet, and the second insulation sheet are sequentially stacked and assembled.

6. The thin profile gas transporting device according to claim 3, wherein the gas pump is a microelectromechanical systems (MEMS) gas pump.

7. The thin profile gas transporting device according to claim 1, wherein a diameter of the pressure relief holes is within a range between 0.1 mm and 1 mm.

8. The thin profile gas transporting device according to claim 7, wherein the diameter of the pressure relief holes is 0.8 mm.

9. The thin profile gas transporting device according to claim 7, wherein the pressure relief holes are arranged as a triangle.

10. The thin profile gas transporting device according to claim 7, wherein the pressure relief holes are arranged as a rectangle.

11. The thin profile gas transporting device according to claim 7, wherein the pressure relief holes are arranged as a polygon.

12. The thin profile gas transporting device according to claim 7, wherein the pressure relief holes are arranged as an arc.

13. The thin profile gas transporting device according to claim 7, wherein the pressure relief holes are arranged as a circle.

14. The thin profile gas transporting device according to claim 7, wherein the pressure relief holes are arranged as an array.

* * * * *